United States Patent [19]

Fujii et al.

[11] 4,448,514
[45] May 15, 1984

[54] SPLIT EXPOSURE OPTICAL SYSTEM FOR COPYING MACHINE

[75] Inventors: Yozo Fujii; Hirofumi Sakaguchi; Tsugio Hirabayashi, all of Hachioji, Japan

[73] Assignee: Konishiroku Photo Industry Co., Ltd., Tokyo, Japan

[21] Appl. No.: 363,917

[22] Filed: Mar. 31, 1982

[30] Foreign Application Priority Data

Apr. 25, 1981 [JP] Japan .................................. 56-63156

[51] Int. Cl.³ ............................................. G03G 15/00
[52] U.S. Cl. .......................................... 355/8; 355/11
[58] Field of Search .................... 355/8, 3 R, 11, 49, 355/65, 66

[56] References Cited

U.S. PATENT DOCUMENTS

| | | | |
|---|---|---|---|
| 4,332,460 | 6/1982 | Costanza | 355/8 |
| 4,353,643 | 10/1982 | Statt | 355/8 X |
| 4,355,883 | 10/1982 | Landa | 355/8 |
| 4,371,254 | 2/1983 | Beery | 355/8 |

Primary Examiner—Richard L. Moses
Attorney, Agent, or Firm—Jordan B. Bierman; Linda Bierman; C. Cornell Remsen, Jr.

[57] ABSTRACT

The slit exposure optical system for a copying machine generally includes two mirror-carrying movable tables of which one is driven at half the speed of the other. Normally each table is driven from one and the same end which means that the other end of each table must follow. If such following is not precise, aberrations in the optical system result. The present invention provides means for interconnecting the nondriver ends of the tables in such a manner that the movement of the nondriver ends will precisely follow the movement of the driver ends and aberrations are thereby avoided.

2 Claims, 1 Drawing Figure

SPLIT EXPOSURE OPTICAL SYSTEM FOR COPYING MACHINE

BACKGROUND OF THE INVENTION

The present invention relates to an improvement in a slit exposure optical system which is to be used in a copying machine or the like.

As is well known, in a copying machine, a slit exposure optical system having two movable tables is used in order to constantly maintain an optical path length of an original image incident upon a projection lens. Specifically, a slit exposure optical system of this kind is equipped with a primary movable table having a slit for scanning the surface of an original and a primary mirror, and a secondary movable table carrying a secondary mirror which receives an incident ray of light from the primary mirror, and a motor-driven wire sheave means is suspended between the respective one end of said movable tables; the secondary movable table is driven by said wire sheave means at a half of the speed of the primary movable table.

In such a slit exposure optical system as described above, it is necessary that the mirrors on the primary and the secondary movable tables should always be at right angles to the moving direction of the movable tables. However, if the primary and the secondary movable tables are driven only at one ends thereof, the other ends thereof are delayed in motion in the backward direction of the movement thereof, and an aberration is thus caused between both ends of the optical axes of the mirror. The above phenomenon becomes a problem particularly in large-sized copying machines in which the movable table is becoming larger in size and heavier in weight, or in high-speed copying machines in which there is a sudden acceleration or deceleration of the movable table. To solve this problem, in a conventional type of a large-sized copying machines, two pairs of wire sheave means are arranged respectively between the both ends of the movable tables, and a driving force is applied to the both wire sheave means, and the both movable tables are thus driven. However, the arrangements of two pairs of wire sheave means for driving use as mentioned above complicates the driving system and increases the manufacturing costs thereof.

SUMMARY OF THE INVENTION

The present invention proposes, taking cognizance of problems of a conventional type of a high speed or a large-sized slit exposure optical system, a slit exposure optical system in which the optical axes of the mirrors is constantly maintained without complicating the driving system of the movable tables.

DETAILED DESCRIPTION OF THE PREFERRED EMBODIMENTS

Figure 1:
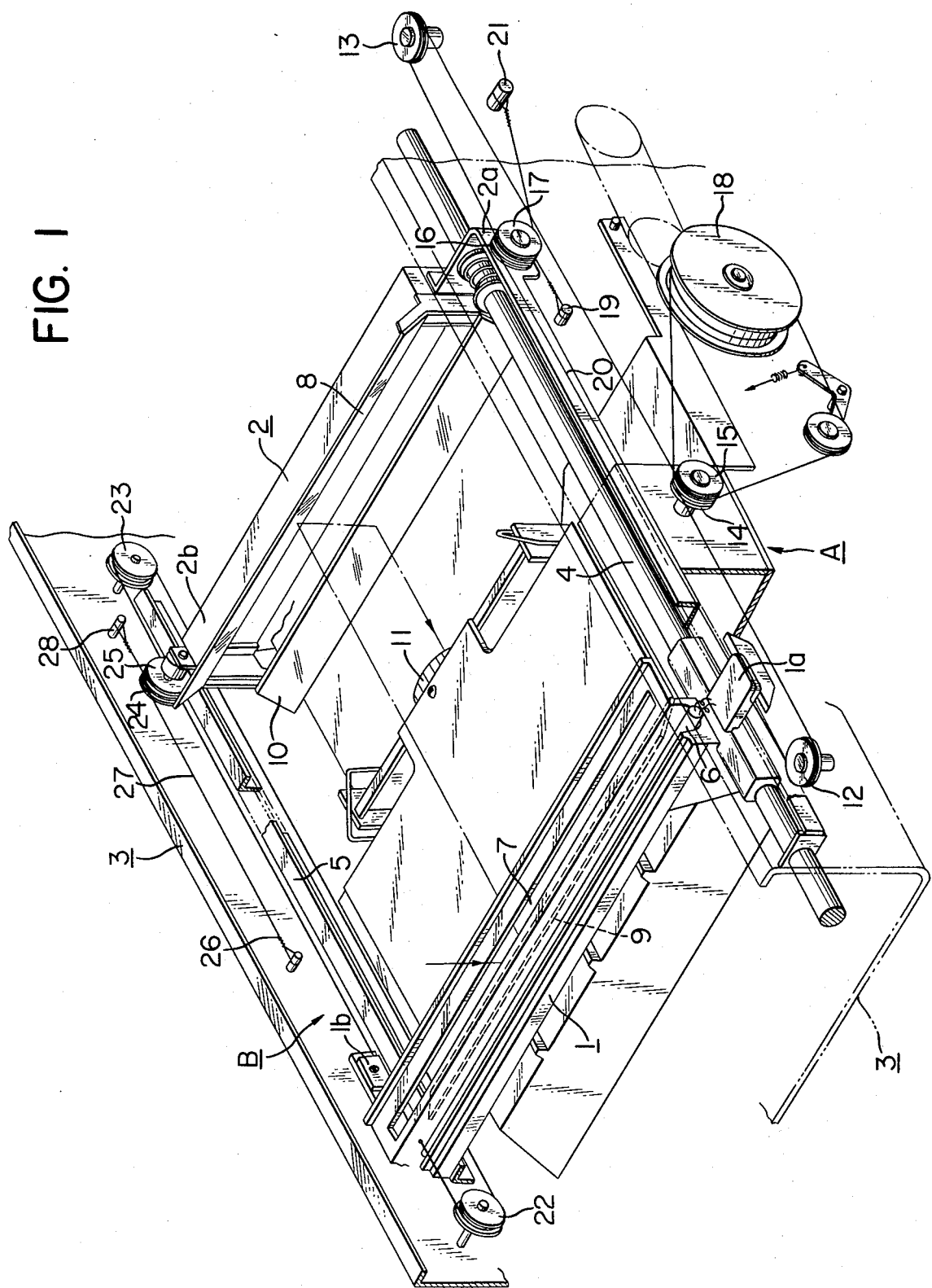
FIG. 1 shows a perspective view of a slit exposure optical system of the present invention.

An example of the present invention will be described hereunder, with reference to FIG. 1:

Each end of both of a primary and a secondary movable tables 1 and 2 of a slit exposure optical system according to the present invention are guided respectively along a guide rod 4 and a guide rail 5 which are positioned on either side of an optical system housing 3. The primary movable table 1 has a slit 7 which scans an original (not shown) illuminated by a lamp 6 and a primary mirror 9 which reflects an incident image coming from said slit 7 upon a secondary mirror 8 being carried by a secondary movable table 2. Secondary movable table 2 supports a tertiary mirror 10 which meets the secondary mirror 8 at right angles, and the reflected image from the secondary mirror 8 impinges upon a projection lens 11 by means of said tertiary mirror 10.

One side of the aforesaid optical system housing 3, is provided with a wire sheave means A by which locomotion is applied to either one end 1a and 2a of said primary and secondary movable tables 1 and 2. Said wire sheave means A is provided with a pair of fixed sheaves 12 and 13 which are oppositely arranged to the moving direction of said primary and secondary movable tables 1 and 2, a two-part sheave 14 and 15 which is positioned on housing 3 between said fixed sheaves 12 and 13, a two-part movable sheave 16 and 17 which is supported on the end of said secondary movable table 2, and a driving drum 18 which is rotated by a motor (not shown). Wire 20 of which one end is fixed to a stay 19 of the optical system housing 3, passes over the movable sheave 16, and is then fixed to end 1a of the primary movable table 1, and is turned about by means of the fixed sheave 12, and passes over the relay sheave 14, the driving drum 18, the relay sheave 15 and the fixed sheave 13, respectively, in that order, and is suspended over the movable sheave 17, with the other end thereof fixed to the stay 21. Accordingly, as a result of the construction of the wire sheave means A on the driving side, it is possible to obtain an arrangement that, according to the direction of the rotation of the driving drum 18, the secondary movable table 2 moves in the same direction as the primary movable table 1, and at a half of the moving speed thereof.

According to the present invention, on the other side of said optical system housing 3, a wire sheave means B is position between the other ends 1b and 2b of the aforesaid movable tables 1 and 2. Said wire sheave means B is provided with a pair of sheaves 22 and 23 fixed on housing 3 at opposite ends of the primary and secondary movable tables 1 and 2, and with a two piece movable sheave 24 and 25 supported on the other end 2b of the secondary movable table 2. A wire 27 of which one end is fixed to a stay 26 on housing 3 is then attached to the other end 1b of the primary movable table 1 after passing over movable sheave 24 is turned around by a fixed sheave 22, and passes over fixed sheave 23 and a movable sheave 25, and at the other end thereof is attached to a stay 28 on housing 3.

A slit exposure optical system of the present invention as described above, is similar to those of the conventional ones in that ends 1a and 2a of primary and secondary movable tables 1 and 2 are driven by a wire sheave means A on the one side, however, because of the wire sheave means B on opposite side connected to the other ends 1b and 2b of said primary and secondary movable tables 1 and 2, a tensile force is generated by wire 27 when the other ends 1b and 2b of the primary and secondary movable tables 1 and 2 are about to be tardier in motion than the motion of opposite ends 1a and 2a. In this connection, both of the ends of primary and secondary movable tables 1 and 2 extend at right angles to the moving directions of said tables, therefore, there causes no aberration of the optical axes of mirrors 8 and 9. Consequently, in accordance with the present invention, it is possible to attain a slit exposure optical system in which the relations of the optical axes of the mirrors can be maintained in a regular state by the relatively inexpensive arrangement.

What is claimed is:

1. In a slit exposure optical system for a copying machine of the type having a frame supporting a primary movable table provided with a scanning slit and a first mirror for reflecting an incident image from said slit upon a second mirror on a secondary movable table, with means including a driving wire interconnecting the same respective ends of said tables for moving the secondary table at half the speed of the previous table, the improvement comprising means interconnecting the respective opposite ends of said tables for insuring that said opposite ends move relatively to one another in the same manner as the driven ends, said last means including a sheave mounted on the opposite end of said secondary table and a supplementary wire attached at its opposite ends to said supporting frame and intermediate its ends extending about said sheave.

2. In a slit exposure optical system according to claim 1, in which said sheave is formed as a double sheave, in combination with two secondary sheaves, one positioned on said frame adjacent the opposite end of said primary table and the other on said frame adjacent the opposite end of said secondary table, and in which said supplementary wire extends from one attached end about one part of said double sheave and thence to said frame at a point adjacent the opposite end of said primary table, thence about said first and second sheaves, and a second part of said double sheave to attachment at its other end to said frame.

* * * * *